June 16, 1942.  O. H. SAMUELSON  2,286,310
BOTTLE MOLD
Filed May 27, 1940  2 Sheets-Sheet 1

INVENTOR.
Otto H. Samuelson,
BY
Hood & Hahn
ATTORNEYS.

June 16, 1942.   O. H. SAMUELSON   2,286,310
BOTTLE MOLD
Filed May 27, 1940   2 Sheets-Sheet 2

INVENTOR.
Otto H. Samuelson,
BY
Hood & Hahn
ATTORNEYS.

Patented June 16, 1942

2,286,310

UNITED STATES PATENT OFFICE 2,286,310

BOTTLE MOLD

Otto Herbert Samuelson, Indianapolis, Ind.

Application May 27, 1940, Serial No. 337,375

7 Claims. (Cl. 49—69)

The present invention relates to molds for molding glassware and the like.

More specifically, it relates to molds for molding blanks from which glass bottles are ultimately formed.

In the forming of glass bottles, particularly of certain types, commercially, the gob of molten glass is placed in a blank former which consists of a pair of mold members adapted to be opened and closed and therefore have a parting line. These mold blanks have cavities therein, one on each side, which, when the two blanks are placed together, form a complete mold cavity adapted to receive the molten glass and to impart thereto its initial formation. After the initial formation has been given to the glass, it is then transferred from the initial molds to the blow molds where the bottle is completed by the process of blowing.

One difficulty which has heretofore been experienced in the use of these blank molds, is the forming on the sides of the blank, fins of glass which even when the glass ultimately goes into the blow mold are not removed.

Commercially, it has been extremely difficult to prevent the formation of these fins which are caused by the separation of the two halves of the mold, particularly when the mold becomes heated. From actual experience, it has been found that although the two sections of the mold accurately fit together when the two halves are initially formed, after the mold has been placed in position in the machine and the same becomes heated, there is a tendency for the two sections to bow out at the tops and bottoms leaving a wide parting line at these points. Furthermore, in the commercial structures, there is a tendency for the face of the blank molds to crack due to the fact that the faces of the molds have a tendency to expand to a greater extent than the backs of the molds under the intense heat of the molten glass dropped therein. This is particularly so where the tops and bottoms of the molds have a tendency to bow out, as above explained.

It is one of the objects of my present invention to provide a blank mold wherein the above difficulties will be overcome by an extremely simple construction.

For the purpose of disclosing my invention, I have illustrated an embodiment thereof in the accompanying drawings, in which.

Figure 1:
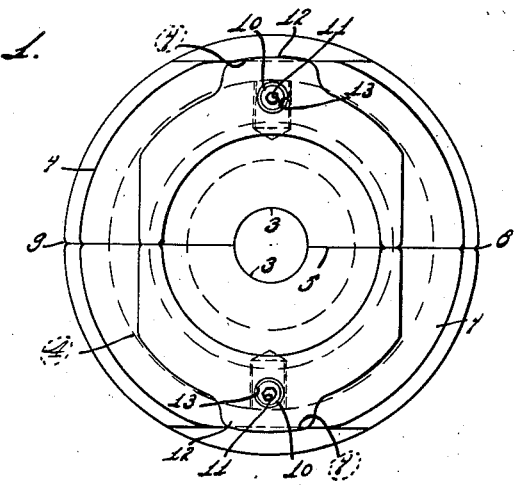
Fig. 1 is a plan view of my improved blank mold.
Figure 2:
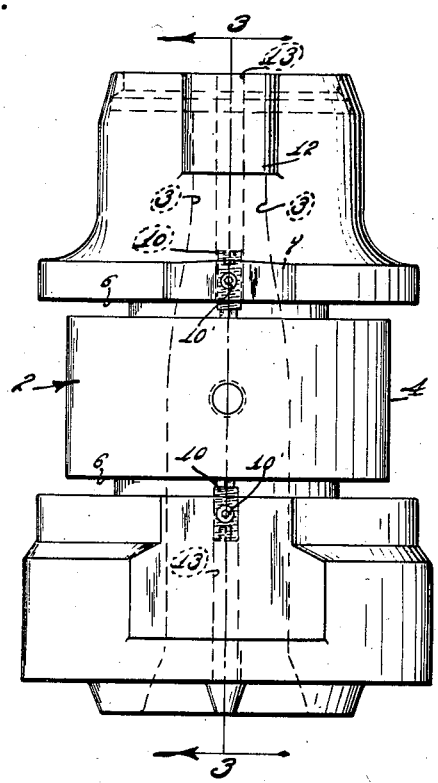
Fig. 2 is a side elevation thereof.
Figure 3:
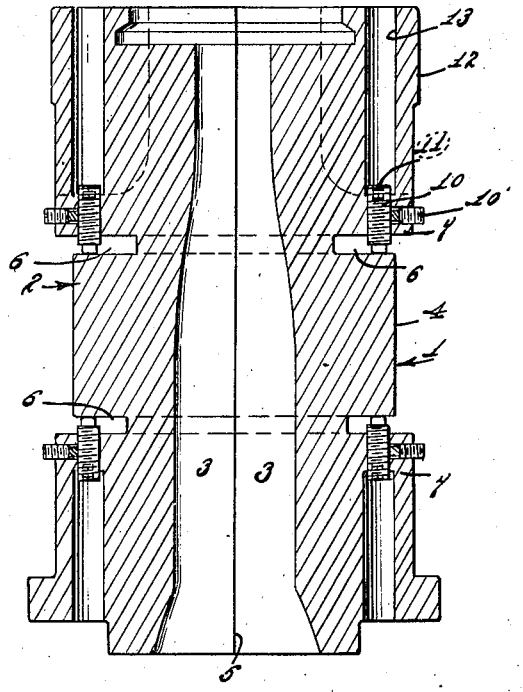
Fig. 3 is a sectional view taken on the line 3—3 of Fig. 2.

Referring to the structure illustrated, the parison or blank mold, as is illustrated, comprises two sections 1 and 2, each of the same construction. Each section has formed in the face thereof a cavity 3 of the proper size and shape to impart to the glass delivered to the mold, the proper size and shape of the blank. This blank, it will be understood, is immediately then transferred from the blank mold to the blow mold. The blank molds are, in commercial practice, usually supported by the supporting members secured at approximately the center or at the point 4 and the mounting is such that the two halves of the mold may be opened or separated to permit the delivery therefrom of the blank. This, of course, necessarily means that there is a parting line 5 in the mold.

In the structure illustrated, I preferably provide annular grooves 6 in each half of the mold immediately above and below the center portion and immediately above and below that portion of the mold which is engaged by the supporting arms. To a certain extent, this weakens the mold sections at this point.

On each side of each mold section, I also provide laterally extending lips 7 which are preferably centrally spaced between the two edges 8 and 9 of the sections. These lips carry set screws 10 which are preferably of the cap screw type having SAE threads and provided with irregular-shaped counter-sunk openings 11. An overhanging lip 12 overhangs the lip 7 and to permit access to the screws, these overhanging lips 12 are provided with bores 13 and the adjusting screws 10 may be locked in their position by brass locking screws 10'.

It is to be noted that each section of the mold is provided with the set screws above and below the center portion 4 of the section and while I have illustrated only one adjusting screw above and below, it is obvious that if desired, a greater number of screws may be used.

Figure 4:
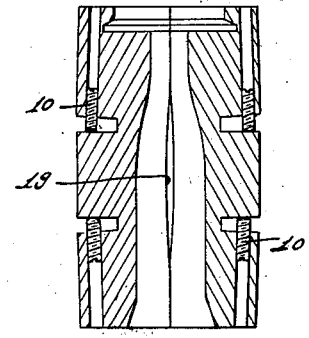
Fig. 4 is an exaggerated diagrammatic view illustrating the operation of my invention.

In my structure, referring to Fig. 4, while the mold is still cold, by the proper manipulation of the screws 10, the top and bottom portions of each section is bowed in by actually straining the metal so that, when the mold is cold, there is a greater separation between the mold sections at the center point 19 than at the top and bottom. This separation is very nicely calculated and due to the fact that the screws 10 have extremely fine threads, a very nice adjustment may be made. As a result, due to this bowing in of each section toward the other at the parting line, by these set screws, when the mold becomes heated and the hot molten glass is deposited therein, the tendency of the top and bottom portions 15 and 16 to expand outwardly will be just sufficient to straighten up the parting line so that the two mold sections will meet accurately and there will be no gap left between the sections at the parting line.

I have found that, in order to prevent the sticking of the set screws 10 in their sockets, it is advisable to lubricate the same by oil or a mixture of oil and graphite or to even use pure graphite alone.

The operator of the machine may very quickly learn the proper adjustment to make on the mold sections and therefore adjust the bowing to the correct point to provide an absolute straight meeting face. Furthermore, the arrangement is such that even after the molds have been placed in the machines and after a run of a few bottles, if it is discovered that there is still a fin formed thereon, the operator may, without removing the mold from the machine, properly adjust the parts to get a correct meeting of the faces at the parting line.

Furthermore, I have discovered that the tendency of the mold cavity face is to crack under the expansion, as would take place as in prior art structures, is prevented, apparently due to the fact that initially, the metal in the faces of the mold, when the sections are bowed, is somewhat compressed by the bowing, and when the metal tends to expand, it will not expand to the point where cracking takes place. Furthermore, due to the fact that the sections are bowed in and, furthermore, due to the fact that the set screws provide braces, undue expansion cannot take place, due to the rapid heating of the face of the interior of the mold and the cracking or crazing of the faces of the mold cavities is prevented.

Each of the mold sections is formed of metal, preferably cast iron, and, therefore, with the construction shown, lends itself to the slight bowing or bending necessary for accomplishing the results sought. It is to be understood, of course, that the bowing in of the mold sections, is necessarily very slight, being not more than a few thousandths of an inch, and is just enough to compensate for the expansion of the metal under heat so that when the mold sections are heated up, the meeting faces of the sections will be perfectly true from top to bottom, enabling the sections to close tightly.

I claim as my invention:

1. A glass mold comprising two mold sections having meeting faces adapted to abut at the parting line, shoulders formed on each section intermediate of its ends and adjusting screws carried in a portion of each section above said shoulders and adapted to abut against said shoulders to bow that portion of each section above said shoulders inwardly toward the parting line.

2. A glass mold comprising two mold sections having meeting faces adapted to abut at the parting line, annular shoulders formed on said sections intermediate of its ends, laterally extending lugs formed on each section and adapted to overhang said shoulders, and adjusting screws extending through said lugs and adapted to abut said shoulders for bowing the upper and lower part of each section inwardly toward the parting line.

3. A glass mold comprising two separable mold sections having abutting faces adapted to meet at a parting line with an uninterrupted contact throughout the meeting face area and having a tendency to separate from said contact at the top and bottom under the influence of heat, and means for bowing each section adjacent its top and bottom toward the parting line when said sections are cold, to compensate for said separation tendency.

4. A glass mold comprising two separable mold sections having faces adapted to abut at a parting line with uninterrupted contact throughout the abutting area and having a tendency to separate from said contact at their ends under the influence of heat, said sections being adapted to be supported intermediate of their ends, said sections being weakened transversely above and below said supporting point, and means for bowing the sections toward the parting line above and below the supporting point when said sections are cold, to compensate for said separation tendency.

5. A glass mold comprising two mold sections having meeting faces adapted to abut at the parting line with uninterrupted contact throughout the abutting area and having a tendency to separate from said contact at their tops and bottoms under the influence of heat, each section being weakened transversely at points intermediate of its top and bottom, and means for exerting pressure on the sections above said weakened points to bow the sections toward the parting line at their tops and bottoms while said sections are cold, to compensate for said separation tendency.

6. A glass mold comprising two separable mold sections having abutting faces adapted to meet at a parting line with an uninterrupted contact throughout the meeting face area and having a tendency to separate from said contact at the top and bottom under the influence of heat, said sections each having a groove formed therein intermediate of its ends and extending from the outer surface inwardly toward the meeting face, and means for spreading said groove to bow each section adjacent its top and bottom toward the parting line when said sections are cold to compensate for said separation tendency.

7. A glass mold comprising two separable mold sections having abutting faces adapted to meet at a parting line with an uninterrupted contact throughout the meeting face area and having a tendency to separate from said contact at the top and bottom under the influence of heat, each of said sections intermediate of its top and bottom having a groove formed therein extending from the outer surface inwardly toward the abutting face and screw means for wedging the walls of said grooves apart to cause a bowing of each section adjacent the top and bottom toward the parting line when said sections are cold to compensate for said separation tendency.

OTTO H. SAMUELSON.